United States Patent
Alharthi et al.

(10) Patent No.: US 12,500,939 B2
(45) Date of Patent: Dec. 16, 2025

(54) SECURE REAL-TIME UPDATES FOR ISOLATED SECURITY SYSTEMS

(71) Applicant: SAUDI ARABIAN OIL COMPANY, Dhahran (SA)

(72) Inventors: Nasser S. Alharthi, Dhahran (SA); Monther I. Busbait, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 164 days.

(21) Appl. No.: 18/461,315

(22) Filed: Sep. 5, 2023

(65) Prior Publication Data
US 2025/0080585 A1    Mar. 6, 2025

(51) Int. Cl.
*H04L 9/40* (2022.01)
*G06F 8/65* (2018.01)
*H04L 61/2567* (2022.01)

(52) U.S. Cl.
CPC ............ *H04L 63/20* (2013.01); *G06F 8/65* (2013.01); *H04L 61/2567* (2013.01); *H04L 63/0281* (2013.01); *H04L 63/029* (2013.01)

(58) Field of Classification Search
CPC ....... G06F 8/65; G06F 21/57; H04L 61/2517; H04L 61/2521; H04L 61/2528; H04L 61/2532; H04L 61/2539; H04L 61/256; H04L 61/2567; H04L 61/2585; H04L 61/2589; H04L 63/20; H04L 63/02; H04L 63/0209; H04L 63/0218; H04L 63/0236; H04L 63/029; H04L 63/0281; H04L 63/0407
See application file for complete search history.

(56) References Cited

U.S. PATENT DOCUMENTS

| 7,908,651 B2 | 3/2011 | Maher |
| 2005/0053063 A1* | 3/2005 | Madhavan .......... H04L 61/2514 709/245 |
| 2019/0325139 A1 | 10/2019 | Dewan |
| 2019/0327135 A1 | 10/2019 | Johnson |

(Continued)

FOREIGN PATENT DOCUMENTS

WO    2013/091241 A1    6/2013

OTHER PUBLICATIONS

ISR-WO from child application to this US application: PCT/US2024/045197.

(Continued)

*Primary Examiner* — Kostas J Katsikis
(74) *Attorney, Agent, or Firm* — Vorys, Sater, Seymour and Pease LLP

(57) ABSTRACT

Methods and systems provide secure, real-time software updates over a public network to an isolated security system. A method includes the steps of setting up a network address translation (NAT) data structure for allowing outbound connections only through a first firewall between the isolated security system and the public network, and configuring the isolated security system to identify an internet web gateway address to get a software update from a security system update manager over a predetermined protocol and port. A further step involves configuring a proxy setting in the isolated security system to identify an internet web gateway address of a proxy server in a NAT subnet.

14 Claims, 4 Drawing Sheets

(56) References Cited

U.S. PATENT DOCUMENTS

2021/0044579 A1* 2/2021 Nelson-Gal ........... H04L 63/062
2023/0319075 A1* 10/2023 Ingleby ............... H04L 63/1416
　　　　　　　　　　　　　　　　　　　　　　　　726/23

OTHER PUBLICATIONS

Connect to the Internet Using an Internet Gateway User Guide; retrieved from https://docs.aws.amazon.com/vpc/latest/userguide/VPC_Internet_Gateway.html (2023).

Elizabeth D. Zwicky, Simon Cooper, D. Brent Chapman; Building Internet Firewalls, 2nd Edition, Chapter 9. Proxy Systems; Jun. 2000.

* cited by examiner

300

| [Source] | [Destination] |
|---|---|
| IWG Public IP | Security System Cloud IP |

140 → 330

| [Source] | [Destination] |
|---|---|
| Security System Private NAT IP | IWG Public IP |

115 → 320

| [Source] | [Destination] |
|---|---|
| Security System Private IP | IWG NAT IP |

SECURE REAL-TIME UPDATES FOR ISOLATED SECURITY SYSTEMS

FIELD OF THE DISCLOSURE

The present disclosure relates generally to network communication and, more particularly, to security system updates.

BACKGROUND OF THE DISCLOSURE

Data networks are increasingly relied upon to provide software updates to remote systems across a geographic area. These software updates for example are generated at a security system cloud and distributed to remote security systems. The software updates are installed on the remote security systems to guard against cyberattacks, malware, and other security threats. Software updates also may include code to update system performance, remove bugs, or meet compliance requirements or other design improvements. However, it is difficult to provide software updates to isolated security systems in a private network. Such isolated security systems require access to a security system cloud over the Internet to get software updates.

Several conventional approaches to provide software updates to isolated systems have been used but each approach is limited. One approach manually downloads the updates from an external machine. This requires a proper scan to ensure integrity of the updates. Updates also have to be copied into an external hard drive or thumb drive and then manually installed into the isolated system. This can be time-consuming, inconvenient and expensive. Security systems need to get updates more frequently due to emerging attacks and threats. Also, not all updates have the same installation which requires further expertise prior to a manual update from an external machine.

Another conventional approach provides software to remote systems through a centralized manager. For example, a centralized manager may have access to a service cloud provider via a global network, such as, the Internet. The centralized manager can then distribute software updates to remote security systems as needed over the Internet. However, some security systems require direct access to the Internet where a centralized manager is not an option.

A third approach is to add an additional Network Interface Card (NIC) in the isolated security system so it can be connected to a public network where it has access to the Internet. This jeopardizes private network design which should be isolated and increases security risk.

A fourth approach is to use local update servers to connect to the cloud to get updates from one NIC and connect to remote security systems in a private network on another NIC. This too is impractical and expensive. Not all updates and systems supports such a setup. This jeopardizes private network design where it should be isolated. Also, a local update server may not be able to handle large numbers of simultaneous updates resulting in unreliable method.

Finally, a Virtual Private Network (VPN) can be used to secure the connection between the security system and its cloud. However, this approach only works if the cloud has a VPN gateway which is not the case for regular software updates in many installations and for many system configurations.

What is needed is a method and system that may connect isolated security systems to a security system cloud over the Internet securely without breaking the design of a private network.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method for providing secure, real-time software updates over a public network to an isolated security system is disclosed. The method includes the steps of setting up a network address translation (NAT) data structure for allowing outbound connections only through a first firewall between the isolated security system and the public network, and configuring a proxy setting in the isolated security system to point to an internet web gateway NAT IP address (IWG NAT IP) that is translated by the first firewall to a private internet web gateway IP address to get a software update from a security system update manager over a predetermined protocol and port.

In another embodiment, a system for providing secure, real-time software updates over a public network to an isolated security system is disclosed. The system includes an isolated security system, an internet web gateway having an internet web gateway address, and a first firewall coupled between the isolated security system and the internet web gateway. The first firewall is set up with a NAT data structure to allow only outbound connections through the first firewall between the isolated security system and the public network. The isolated security system is configured with a proxy setting to point to an internet web gateway NAT IP address (IWG NAT IP) that is translated by the first firewall to a private internet web gateway IP address to get a software update from a remote security system update manager over a predetermined protocol and port.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is a diagram that illustrates example tables showing network address translations configured for components of the system of FIG. 1.

DETAILED DESCRIPTION

Figure 1:
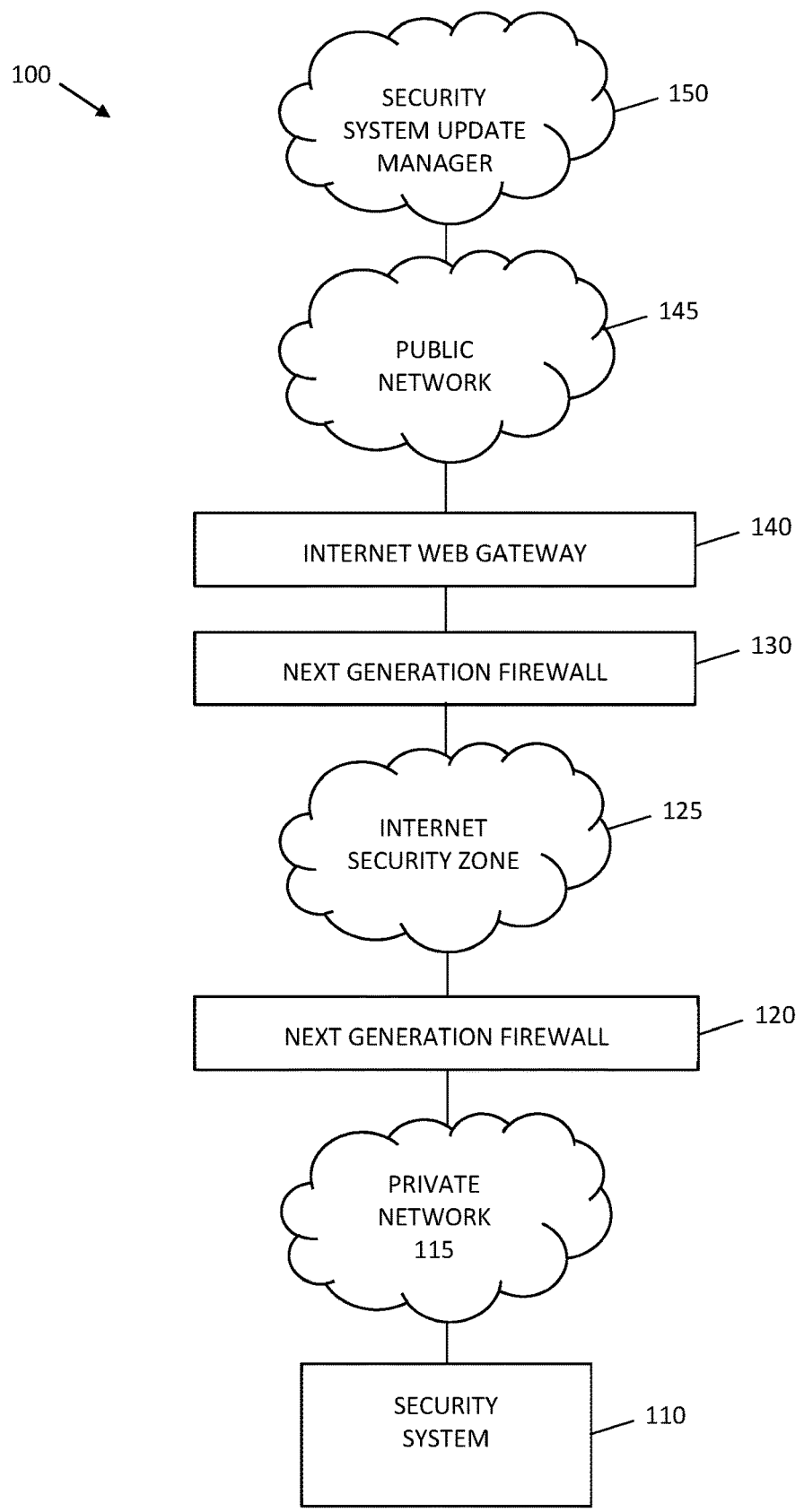
FIG. 1 is a diagram of a system for providing secure, real-time software updates over a public network to an isolated security system according to an embodiment.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure relate to system updates and, more particularly, to security system software updates provided to an isolated security system. Methods and systems are disclosed that connect isolated security systems (such as a security system in a private network) to a security system cloud over a public network (such as the Internet) securely without breaking the design of a private network.

Terminology

The following terms as used herein are defined below.

The term "public network" refers to a data network or combination of data networks accessible by the public and which support network communication using a communication protocol and ports. A public network may include, but is not limited to, the Internet using a suite of communication protocols, such as, Transmission Control Protocol/Internet Protocol (TCP/IP) and network addresses.

The term "private network" refers to a data network or combination of data networks that uses a private network address space only accessible by a limited number of users. A private network may include, but is not limited to, a local area network (LAN) having private IP addresses for a group of users, such as, employees or other authorized users in a business or enterprise.

The term "security system update manager" refers to a computer-implemented functional unit or module that provides software updates to remote security systems.

The term "security system" refers to a computing device that receives software updates.

System

FIG. 1 is a diagram of a system 100 for providing secure, real-time software updates over a public network to an isolated security system according to an embodiment. System 100 includes a security system 110 coupled through an internet web gateway 140 over a public network 145 (such as the Internet) to a remote security system update manager 150. Security system 110 is isolated from public network 145 by a private network 115 and next generation firewall 120. Further security is provided by an internet security zone 125 coupled between next generation firewalls 120 and 130. Next generation firewall 130 is further coupled to internet gateway 140.

In embodiments, internet security zone 125 may be an area of a network with limited access to users to prevent unauthorized access or with other specific policies or protocols to reduce or block external cyber threats. Next generation firewalls 120 and 130 may each be a firewall with next generation functions to protect connections and make sure connections are valid and secure. Such next generation functions include, but are not limited to, application awareness and control, deep-packet inspection, integrated intrusion prevention or cloud-delivered external threat intelligence. For example, each next generation firewall 120, 130 may be a network security device carrying out stateful inspection of incoming and outgoing traffic like a conventional firewall plus additional next generation functions. In one example, a next-generation firewall 120, 130 can operate at layer 2 (data link) and up to layer 7 (application layer) of an Open Systems Interconnection (OSI) model.

In embodiments, security system 110 and security system update manager 150 may each be implemented in software, firmware, hardware or any combination thereof on a computing device. Such a computing device can include, but is not limited to, a mobile computing device (such as a smartphone or tablet computer), wearable computing device (such as a smart watch or headset), a desktop computer, laptop computer, set-top box, smart television, smart display screen, kiosk, or other type of computing device having at least one processor and computer-readable memory. In addition to at least one processor and memory, such a computing device may include software, firmware, hardware, or a combination thereof. Software may include one or more applications, a browser, and an operating system. Hardware can include, but is not limited to, a processor, memory, display or other input/output device. A communication interface and transceiver can be included to perform data communication (wired or wireless) over a network. Embodiments may be directed to computer program products comprising software stored on any computer usable medium such as memory. Such software, when executed in one or more data processing device, causes a data processing device(s) to operate as described herein.

Security system update manager 150 may be implemented on one or more different computing devices at the same or different locations. In embodiments, security system update manager 150 may be implemented as part of a cloud computing service or platform. A cloud platform supporting security system update manager 150 may be implemented in an architecture distributed over one or more networks 145, such as, for example, a cloud computing architecture. Cloud computing includes but is not limited to distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), application programming interface as a service (APIaaS), or an integration platform as a service (IPaaS).

Security system update manager 150 may be configured to generate software updates. Security system update manager 150 may also be coupled to other services or programs through application programming interface (APIs) to receive information or software to be included in a security software update. Computer-readable memory may also be coupled to security system update manager 150 to store generated software updates. Databases may also be used to store records and other information relating to a generated software update.

Operation

In operation, secure, real-time updates may be provided to security system 110. Internet web gateway 140 has a public internet web gateway address IWG IP (table 320) and a private proxy IWG IP address (table 310). Public addresses are used to communicate over public network 145 (such as the Internet). Private addresses are used for internal users to access an Internet gateway 140 (also known as proxy addresses).

Next generation firewall 120 is set up with a network address translation (NAT) data structure to allow only outbound connections through firewall 120 between security system 110 and public network 145. Security system 110 is configured with a proxy setting to point to the NAT IP address (table 310), then translated to the private internet gateway address (table 320) via firewall 120 to get a software update from remote security system update manager 150 over a predetermined protocol and port. In this way, security system 110 may receive software updates from security system update manager 150 securely and in real-time. Software updates may be provided through the predetermined protocol and port in connections through public network 145, internet web gateway 140, second next generation firewall 130, internet security zone 125, first next generation firewall 120, and private network 115.

In one feature, secure communication from security system 110 on only allowed outbound connections is enforced throughout system 100. First and second next generation firewalls 120, 130 each apply rules to allow only outbound connections with NAT and to enforce application layer inspection, provide intrusion detection and prevention, and analyze malware. Internet security zone 125 may also provide secure outbound access to public network 145 and may implement various security controls such as stateful access filtering, intrusion detection and prevention as well as malware analysis.

Internet web gateway 140 is configured to only allow communication initiated from security system 110 at a private NAT IP address as per 115 to security system update manager 150 on a predetermined IP protocol and port. This helps ensure connection to legitimate services which are inspected for malware or other malicious attacks. Internet web gateway 140 also may apply a white listing rule to determine whether the first next generation firewall 120 will allow connection between security system 110 and security system update manager 150.

In a further feature, security system 110 may be proxy aware. For example, security system 110 may have one or more proxy settings configured to point to an IWG NAT IP address 310 as a proxy server in a NAT subnet.

Figure 2:
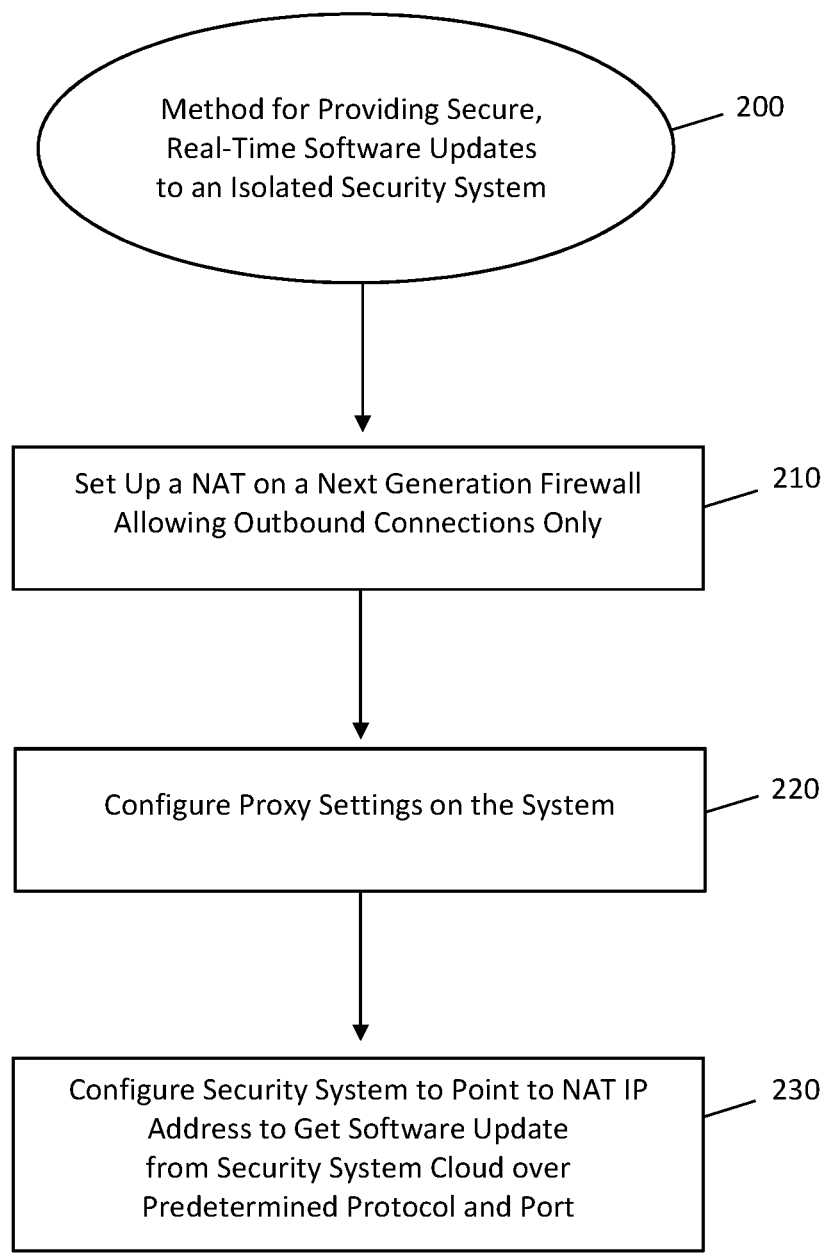
FIG. 2 is a flowchart diagram of a method for providing secure, real-time software updates over a public network to an isolated security system according to an embodiment.

The operation of system 100 is described further with respect to method 200 in FIG. 2 and examples of network address translations and URLs shown in FIG. 3.

Method

FIG. 2 shows a method 200 for providing secure, real-time software updates over a public network to an isolated security system according to an embodiment (steps 210-230). FIG. 3 illustrates example network address translations configured for components of system 100. For brevity, method 200 will be described with reference to system 100 and its components and example network address translations shown in FIG. 3. However, this is not necessarily intended to limit method 200 as other system components and network address translations may be used to carry out method 200 as would be apparent to a person skilled in the art given this description.

In step 210, a network address translation (NAT) data structure is set up for allowing outbound connections only through a first firewall between an isolated security system and a public network. Next generation firewalls 120 and 130 may each be configured to allow outbound connections only between security system 110 and public network 145 according to stored network address translations. For example, FIG. 3 shows a NAT data structure made up of a table 320 associating respective allowed source and destination addresses. As shown in table 320, a source address may be a secure address ("Security System Private NAT IP") of an allowed source (security system 110), while a destination address may be an IP address ("IWG IP") of an allowed outbound connection to internet web gateway 140.

Next generation firewalls 120 and 130 may also each apply rules to allow only outbound connections and to enforce application layer inspection, provide intrusion detection and prevention, and analyze malware.

In step 220, the method includes configuring proxy settings in the isolated security system 110. These proxy settings may be for configurations having one or more proxy servers in a NAT subset to provide further security. An internet web gateway address (an IWG NAT IP address) of a proxy server in a NAT subnet can be used to identify an allowed destination. A proxy setting in the isolated security system 110 can be set to point to an internet web gateway NAT IP address (IWG NAT IP) that is translated by a firewall 120 to a private internet web gateway IP address.

In step 230, the method includes configuring the isolated security system 110 to identify (point to) an allowed secure private internet web gateway address (such as an IWG NAT IP address) to get a software update from a security system update manager 150 over a predetermined protocol and port. For example, FIG. 3 shows a NAT data structure made up of a table 310 associating respective allowed source and destination addresses. As shown in table 310, a source address may be a secure address ("Security System Private IP") of an allowed source (security system 110), while a destination address may be an IP address ("IWG NAT IP") of an allowed outbound connection to internet web gateway 140.

In a further aspect, method 200 may also include a step of applying a white listing rule to determine whether internet web gateway 140 will allow connection between isolated security system 110 and security system update manager 150 to receive software updates. For example, FIG. 3 shows a NAT data structure made up of a table 330 associating respective allowed source and destination addresses. As shown in table 330, a source address may be an address ("IWG Public IP") of an allowed internet web gateway 140, while a destination address may be an IP address ("Security System Cloud IP") of an allowed outbound connection to security system update manager 150. In one example, internet web gateway 140 may be configured to apply the white listing rule. Finally, security system 110 may store a predetermined address (such as, a web URL address associated with a web address of secure system update manager 150 that provides secure software updates, URL: https://SecurityCloudExampleIP.com:443). Security system 110 may also store the IP address of a proxy server (such as an internal web gateway NAT IP address).

Finally, security system update manager 150 may send a response to security system 110 in a reverse order in the same session.

One advantage as described herein is system updates may be provided securely and in real-time to an isolated security system 110. Security system update manager 150 may be integrated with other global threat intelligence services. These system updates may be generated and sent in real-time by security system update manager 150 in response to known or potential cyberattacks or other detected threats or risks to reputation.

While, for purposes of simplicity of explanation, the example method 200 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

Further Example Computing Implementations

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 4:
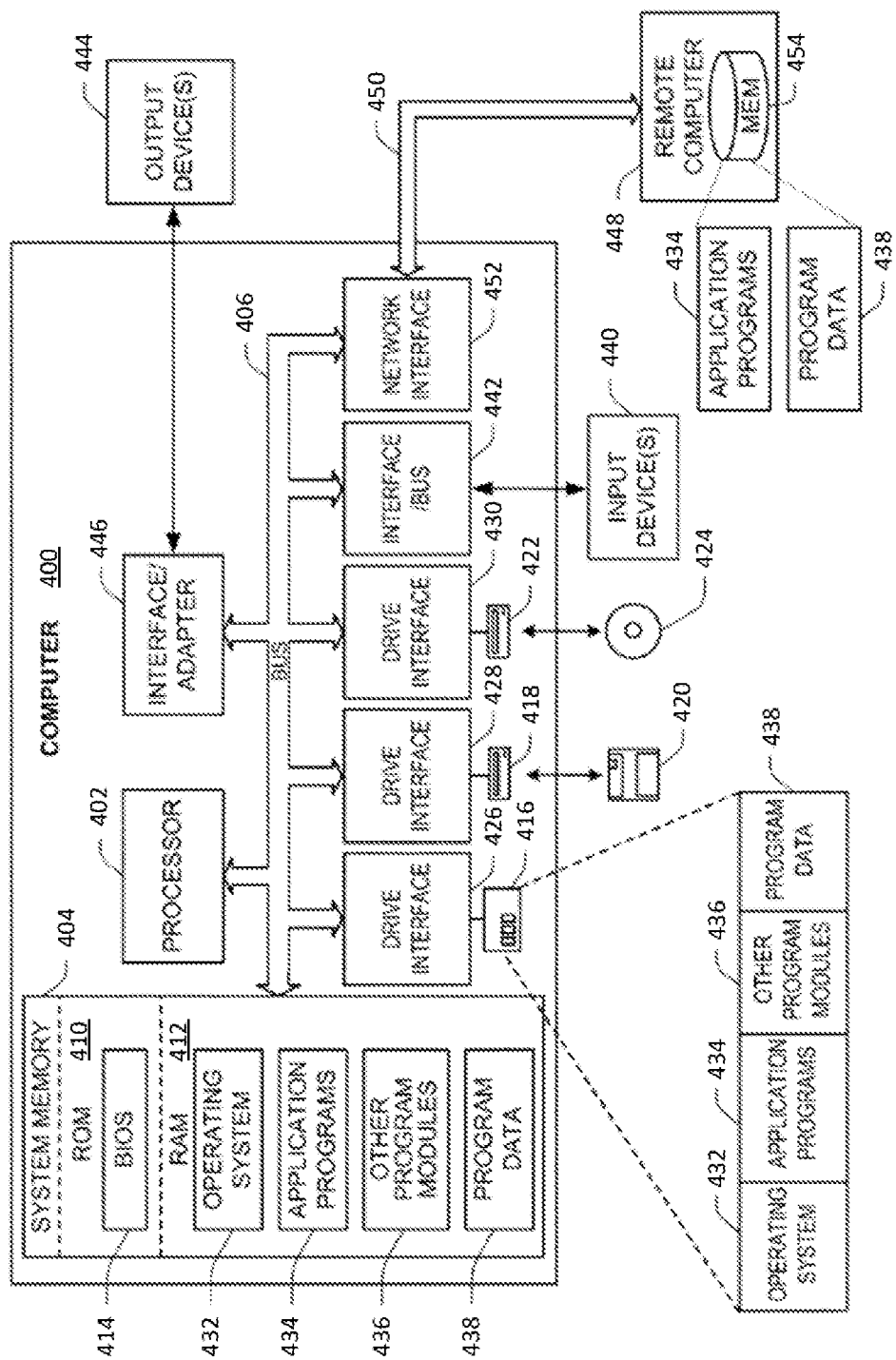
FIG. 4 is a diagram of a computing device according to an embodiment.

In this regard, FIG. 4 illustrates one example of a computer system 400 (that is, a computing device) that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. System memory 404 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 410, including operating system 432, one or more application programs 434, other program modules 436, and program data 438.

In one example for security system 110, the application programs 434 can include security system 110, and the program data 438 can include software updates received from security system update manager 150 and relevant address information for securely accessing software updates (e.g., a web locator address (URL of security system update manager 150 and proxy server address). The application programs 434 and program data 438 can include functions and methods programmed to request and receive software updates securely and in real-time over network 145 as shown and described herein.

In another example for security system update manager 150, the application programs 434 can include security system update manager 150, and the program data 438 can include software to generate software updates for distributing to security system 110 and relevant address information for secure communication through internet web gateway 140 (e.g., "IWG Public IP" address). The application programs 434 and program data 438 can include functions and methods programmed to respond to software update requests and to generate and send software updates securely and in real-time over network 145 as shown and described herein.

In this way, the application programs 434 and program data 438 can include functions and methods programmed to provide secure, real-time software updates over a public network to an isolated security system, such as shown and described herein.

A user may enter commands and information into computer system 400 through one or more input devices 440, such as a pointing device (e.g., a mouse, touch screen), keyboard, microphone, joystick, game pad, scanner, and the like. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 400, or portions thereof, may be stored in a remote memory storage device 454.

Embodiments disclosed herein include:

A. A method for providing secure, real-time software updates over a public network supporting Internal Protocol (IP) addressing to an isolated security system comprising the steps of: setting up a network address translation (NAT) data structure for allowing outbound connections only through a first firewall between the isolated security system and the public network; and configuring the isolated security system to point to an internet web gateway NAT IP address (IWG NAT IP), that is translated to a private IWG address via the first firewall to get a software update from a security system update manager over a predetermined protocol and port.

B. A system for providing secure, real-time software updates over a public network to an isolated security system comprising: an isolated security system; an internet web gateway having a public and a private internet web gateway address; and a first firewall coupled between the isolated security system and the internet web gateway addresses, wherein the first firewall is set up with a NAT data structure to allow only outbound connections through the first firewall between the isolated security system and the public network, and the isolated security system is configured to point to an internet web gateway NAT IP address (IWG NAT IP) that is translated to a private IWG address via the first firewall to get a software update from a remote security system update manager over a predetermined protocol and port.

C. A system for providing secure, real-time software updates over a public network to an isolated security system comprising: means for setting up a NAT data structure for allowing outbound connections only through a firewall between the isolated security system and the public network; and means for configuring the isolated security system to identify an internet web gateway address to get a software update from a security system update manager over a predetermined protocol and port.

Each of embodiments A through C may have one or more of the following additional elements in any combination: Element 1: coupling the isolated security system to a private network. Element 2: the first firewall comprises a first next generation firewall. Element 3: receiving software updates at the isolated security system from the security system update manager over the predetermined protocol and port in connections through the public network, an internet web gateway, a second next generation firewall, an internet security zone, the first next generation firewall, and the private network. Element 4: wherein isolated security system is proxy aware, and further comprising the step of configuring proxy settings in the isolated security system to identify an internet web gateway address of a proxy server in a NAT subnet. Element 5: applying a white listing rule to determine whether the first next generation gateway with allow connection between the isolated security system and the security system update manager. Element 6: wherein the first and second next generation firewalls each apply rules to allow only outbound connections and to enforce application layer inspection, provide intrusion detection and prevention, and analyze malware.

By way of non-limiting example, exemplary combinations applicable to A through C include: Element 1 with Element 2; Element 2 with Element 3; Element 2 with Element 4; Element 4 with Element 5; Element 3 with Element 6.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method for providing secure, real-time software updates over a public network supporting Internal Protocol (IP) addressing to an isolated security system comprising the steps of:
    setting up a network address translation (NAT) data structure for allowing outbound connections only through a first firewall between the isolated security system and the public network; and
    configuring the isolated security system to point to an internet web gateway (IWG) NAT IP address that is translated to a private internet gateway address via the first firewall to get a software update from a security system update manager over a predetermined protocol and port.

2. The method of claim 1, further comprising coupling the isolated security system to a private network.

3. The method of claim 2, wherein the first firewall comprises a first next generation firewall.

4. The method of claim 3, further comprising receiving software updates at the isolated security system from the security system update manager over the predetermined protocol and port in connections through the public network, an internet web gateway, a second next generation firewall, an internet security zone, the first next generation firewall, and the private network.

5. The method of claim 3, wherein isolated security system is proxy aware, and further comprising the step of configuring proxy settings in the isolated security system to identify an internet web gateway address of a proxy server in a NAT subnet.

6. The method of claim 5, further comprising applying a white listing rule to determine whether the first next generation gateway with allow connection between the isolated security system and the security system update manager.

7. The method of claim 4, wherein the first and second next generation firewalls each apply rules to allow only outbound connections and to enforce application layer inspection, provide intrusion detection and prevention, and analyze malware.

8. A system for providing secure, real-time software updates over a public network supporting Internal Protocol (IP) addressing to an isolated security system comprising:
    a CPU coupled to a memory and configured to implement at least one of:
        an isolated security system;
        an internet web gateway (IWG) having a public and a private internet web gateway address; and
        a first firewall coupled between the isolated security system and the internet web gateway addresses;
    wherein the first firewall is set up with a network address translation (NAT) data structure to allow only outbound connections through the first firewall between the isolated security system and the public network; and
    wherein the isolated security system is configured to point to an internet web gateway NAT IP address, that is translated to a private IWG address via the first firewall to get a software update from a remote security system update manager over a predetermined protocol and port.

9. The system of claim 8, wherein the isolated security system is coupled to a private network.

10. The system of claim 9, wherein the first firewall comprises a first next generation firewall.

11. The system of claim 10, wherein the isolated security system is configured to receive software updates from the remote security system update manager over the predetermined protocol and port in connections through the public network, the internet web gateway, a second next generation firewall, an internet security zone, the first next generation firewall, and the private network.

12. The system of claim 10, wherein isolated security system is proxy aware and the isolated security system has proxy settings configured to identify the internet web gateway address of a proxy server in a NAT subnet.

13. The system of claim 10, wherein the internet web gateway is configured to apply a white listing rule to determine whether the first next generation gateway with allow connection between the isolated security system and the security system update manager.

14. The system of claim 11, wherein the first and second next generation firewalls each apply rules to allow only outbound connections and to enforce application layer inspection, provide intrusion detection and prevention, and analyze malware.

* * * * *